United States Patent
Leroux (10) Patent No.: US 9,394,862 B2
(45) Date of Patent: Jul. 19, 2016

(54) INTERFACE PART BETWEEN A MOTOR VEHICLE ENGINE HEAD AND A HEAT EXCHANGER

(75) Inventor: Samuel Leroux, Poissy (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 24 days.

(21) Appl. No.: 13/516,829

(22) PCT Filed: Dec. 2, 2010

(86) PCT No.: PCT/EP2010/068775
§ 371 (c)(1),
(2), (4) Date: Aug. 14, 2012

(87) PCT Pub. No.: WO2011/076539
PCT Pub. Date: Jun. 30, 2011

(65) Prior Publication Data
US 2012/0298066 A1 Nov. 29, 2012

(30) Foreign Application Priority Data

Dec. 21, 2009 (FR) .................................. 09 06209

(51) Int. Cl.
*F02M 25/07* (2006.01)
*F02M 35/10* (2006.01)
*F02B 29/04* (2006.01)

(52) U.S. Cl.
CPC ...... *F02M 35/10144* (2013.01); *F02B 29/0475* (2013.01); *F02M 25/07* (2013.01);
(Continued)

(58) Field of Classification Search
CPC ... F02M 25/07; F02M 25/0715; F02M 26/00; F02M 35/10144; F02M 35/10085; F02M 35/1022

USPC ........................................................ 123/193.5
See application file for complete search history.

(56) References Cited

U.S. PATENT DOCUMENTS 4,100,736 A * 7/1978 Nakajima et al. ............. 123/310
6,571,782 B2 * 6/2003 Brosseau et al. ......... 123/568.18
(Continued)

FOREIGN PATENT DOCUMENTS

CN 101171416 A 4/2008
DE 100 28 131 C1 12/2001
(Continued)

OTHER PUBLICATIONS

International Search Report issued in PCT/EP2010/068775, mailed on Feb. 9, 2011, with translation, 6 pages.
Office Action issued in corresponding Chinese Application No. 201080058612.6 dated Dec. 5, 2013, and English translation thereof (20 pages).

*Primary Examiner* — Lindsay Low
*Assistant Examiner* — Jacob Amick
(74) *Attorney, Agent, or Firm* — Osha Liang LLP (57) ABSTRACT

The invention relates to an interface part (10) between a motor vehicle engine head and a heat exchanger (12), the interface part (10) comprising a first opening for the flow of a first gas. According to the invention, the first opening has a profile capable of engaging with a valve element comprising a movable portion (52) of the valve (50), with a view to at least partially sealing the first opening by means of said movable portion (52). The invention also relates to an assembly of such an interface part and a valve, and to a gas supply module for an engine comprising such an assembly. The invention is applicable, in particular, to the automotive field.

11 Claims, 5 Drawing Sheets

(52) U.S. Cl.
CPC ........ *F02M 26/00* (2016.02); *F02M 35/10085* (2013.01); *F02M 35/10222* (2013.01); *F02M 35/10255* (2013.01); *Y02T 10/121* (2013.01); *Y02T 10/146* (2013.01)

(56) References Cited

U.S. PATENT DOCUMENTS

| | | | |
|---|---|---|---|
| 6,895,948 B2 * | 5/2005 | Mori et al. | 123/568.17 |
| 7,204,240 B2 * | 4/2007 | Malone et al. | 123/568.17 |
| 7,607,638 B2 * | 10/2009 | Wilson et al. | 251/129.11 |
| 2006/0130468 A1 * | 6/2006 | Sun et al. | 60/297 |
| 2006/0283429 A1 | 12/2006 | Kuhnel et al. | |

FOREIGN PATENT DOCUMENTS

| | | |
|---|---|---|
| DE | 103 41 393 B3 | 9/2004 |
| DE | 10 2004 013309 A1 | 10/2005 |
| DE | 10 2004 048867 A1 | 4/2006 |
| DE | 10 2006 039497 A1 | 3/2007 |
| DE | 10 2007 040661 A1 | 3/2009 |
| EP | 1 870 591 A2 | 12/2007 |
| FR | 2 931 517 A1 | 11/2009 |
| WO | 2009/141711 A1 | 11/2009 |

* cited by examiner

INTERFACE PART BETWEEN A MOTOR VEHICLE ENGINE HEAD AND A HEAT EXCHANGER

The invention relates to an interface part between a motor vehicle engine head and a heat exchanger, an assembly of such an interface part and a slide valve, and a gas supply module for an engine comprising such an assembly.

The invention relates more particularly to an interface part between a motor vehicle engine head and a heat exchanger bundle, said interface part comprising a first opening for the passage of a first gas.

Such an interface part is disclosed in the document FR 2931517. Said part is incorporated in a gas supply module for an internal combustion engine of a motor vehicle.

A internal combustion engine for a motor vehicle comprises a combustion chamber, generally formed by a plurality of cylinders, in which a mixture of combustion agent and fuel is burned to generate the work of the engine. The combustion agent comprises air, which may be compressed or not, depending on whether the engine comprises a turbocharger or not.

In this document, the interface part comprises two openings: a first opening for a first gas coming from a slide valve located opposite the first opening and a second opening for a second gas, more particularly charge air having passed through a heat exchanger.

The mixture of the two gases thus takes place in the region of an inlet volume of a cylinder head of a motor vehicle.

When the exhaust gases are removed downstream of the combustion chamber of the engine to be rerouted (recirculated) toward the intake gas flow, upstream of the combustion chamber, where they are mixed with charge air for the purpose of being admitted into the combustion chamber, said gases are known as recirculated exhaust gases.

As indicated above, a slide valve is attached to the interface part, thus making the assembly bulky whilst the allocated space below the hood for the gas supply module is increasingly reduced.

The object of the invention is to improve the situation.

To this end, the invention proposes an interface part as disclosed above in which the first opening has a profile capable of cooperating with an element of a slide valve comprising a mobile part of the slide valve in order to seal at least partially the first opening via the mobile part of the slide valve.

An interface part according to the invention thus makes it possible to incorporate at least partially elements of the slide valve, thus reducing the bulk of the gas supply module.

Particular embodiments of the invention propose that:
the interface part further comprises a second opening capable of being aligned with at least one part of the heat exchanger bundle and a connecting channel and in which the first opening and the second opening are connected by the connecting channel,
the interface part further comprises an injection channel extending between the connecting channel and a remote end of the connecting channel of the second opening,
the connecting channel and the injection channel are produced by casting with the interface part,
the second opening has a proximal end of the connecting channel and a distal end of the connecting channel, the injection channel having a volume which decreases between its end adjacent to the connecting channel and its end adjacent to the distal end of the connecting channel,
the injection channel comprises a plurality of orifices opening along the second opening,
the first opening is bordered by a collar capable of defining a fixing edge for a body of the slide valve,
the interface part comprises a periphery having orifices for the connection of the interface part to said cylinder head.
the interface part further comprises a housing for accommodating a temperature and/or pressure sensor.

The invention also relates to an assembly of an interface part as disclosed above and a slide valve in which the slide valve comprises an element having a mobile part of the slide valve and in which the element having the mobile part is capable of cooperating with the profile of the first opening in order to seal at least partially the first opening via the element having the mobile part of the slide valve.

A further particular embodiment of the assembly proposes that the mobile part of the slide valve is a valve and the profile of the first opening is a valve seat.

A further particular embodiment of the assembly proposes that the mobile part is a valve and the profile of the first opening corresponds to the profile of the element comprising the valve.

The invention also relates to a gas supply module for an engine comprising an assembly of an interface part and a slide valve as disclosed above also comprising a heat exchanger provided with a bundle in which the bundle is positioned at least partially in front of the second opening.

A particular embodiment of the module proposes that the module further comprises a slide valve for supplying charge air, capable of directing charge air at least through the heat exchanger.

A further embodiment proposes that the gas supply module for an engine comprises an assembly of an interface part, said interface part being positioned between a motor vehicle engine head and comprising a first opening for the passage of a first gas, a slide valve and a heat exchanger in which said first opening has a profile capable of cooperating with an element of said slide valve comprising a mobile part of said slide valve in order to seal at least partially said first opening via said mobile part, in which said interface part further comprises a second opening and a connecting channel, said first opening and said second opening being connected by said connecting channel and in which said heat exchanger is a cooler for charge air and is provided with a bundle, said bundle being positioned at least partially in front of said second opening of said interface part.

The invention will be understood more clearly with reference to the following description of the preferred embodiment of the device and of the engine of the invention, with reference to the accompanying drawings, in which.

The invention relates to an interface part 10 between a motor vehicle engine head (not shown) and a heat exchanger bundle of a heat exchanger 12.

The interface part 10 comprises, in this case, a first opening 14 for the passage of a first gas and a second opening 16 capable of being aligned with at least one part of the bundle of the heat exchanger 12. In the embodiment illustrated here, the heat exchanger 12 is a cooler for charge air.

The first opening 14 is traversed in this embodiment by recirculated exhaust gases.

The second opening 16, in turn, and always in the embodiment illustrated here, permits the passage of a second gas (in this case charge air) having previously traversed the heat exchanger bundle of the heat exchanger 12.

In the illustrated embodiment, in this case, the second opening 16 has a proximal end 16-1 of a connecting channel 18 (disclosed below) and a distal end 16-2 of the connecting channel 18. The distal end 16-2 could also be called the remote end 16-2 of the connecting channel 18 of the second opening 16. The second opening 16 also has a length and a height.

The interface part 10 closes the inlet volume of the cylinder head and defines a first passage for gases emerging from a slide valve 50 (disclosed below) and a second passage for gases emerging from the heat exchanger 12.

According to the invention, the first opening 14 has a profile capable of cooperating with an element of the slide valve comprising a mobile part (or actuator) 52 of a slide valve 50 in order to seal at least partially the first opening 14 via the element having the mobile part 52 of the slide valve 50.

In other words, according to the invention, the first opening 14 is capable of receiving at least one part of the slide valve 50. The slide valve 50 will be denoted in the remainder of the description as the EGR valve 50.

In the embodiment illustrated here, the opening is capable of receiving a sleeve accommodating in this case the mobile part 52 of the EGR valve 50. The profile of the first opening 14 thus corresponds in this case to the profile of the sleeve.

A further embodiment, not illustrated, proposes that the profile of the first opening 14 is a valve seat. In other words, in such a case, the profile of the first opening 14 is capable of receiving the actuator 52 of the EGR valve 50.

In this embodiment, the interface part 10 further comprises a connecting channel 18, connecting the first opening 14 and the second opening 16.

In other words, the connecting channel 18 permits the first and second openings to communicate so as to obtain a mixture of the two gases (in this case the charge air and the recirculated exhaust gases).

In this embodiment, the two gases are mixed in the region of the second opening 16, the connecting channel 18 permitting the gases from the EGR valve 50 to be directed from the first opening 14 toward the second opening 16.

In this case, the interface part 10 further comprises an injection channel 20.

The injection channel 20 extends between the connecting channel 18 and a remote end 16-2 of the connecting channel 18 of the second opening 16. In other words, in this embodiment, the injection channel 20 extends along the second opening 16. In this case, the injection channel 20 extends over the entirety of the length of the second opening 16.

In the illustrated embodiment, the injection channel 20 is located in the extension of the connecting channel 18 and runs along the second opening 16.

In other words, in this case, the two channels 18 and 20 are merged so as to form a channel fulfilling the functions of a connection between the two openings and the injection of the first gas into the second gas in the region of the second opening 16.

Also, in order words, the recirculated exhaust gases do not pass through the heat exchanger 12 and are introduced into the interface part 10 via the two channels 18 and 20, the interface part 10 being arranged at the outlet of the heat exchanger bundle of the heat exchanger 12.

In one particular embodiment, the connecting channel 18 and the injection channel 20 are produced in a part cast with the interface part 10.

According to one particular embodiment, the injection channel 20 has a volume which decreases between its end located adjacent to the connecting channel 18 and its end located adjacent to the distal end 16-2 of the second opening 16 of the connecting channel 18.

Figure 3:
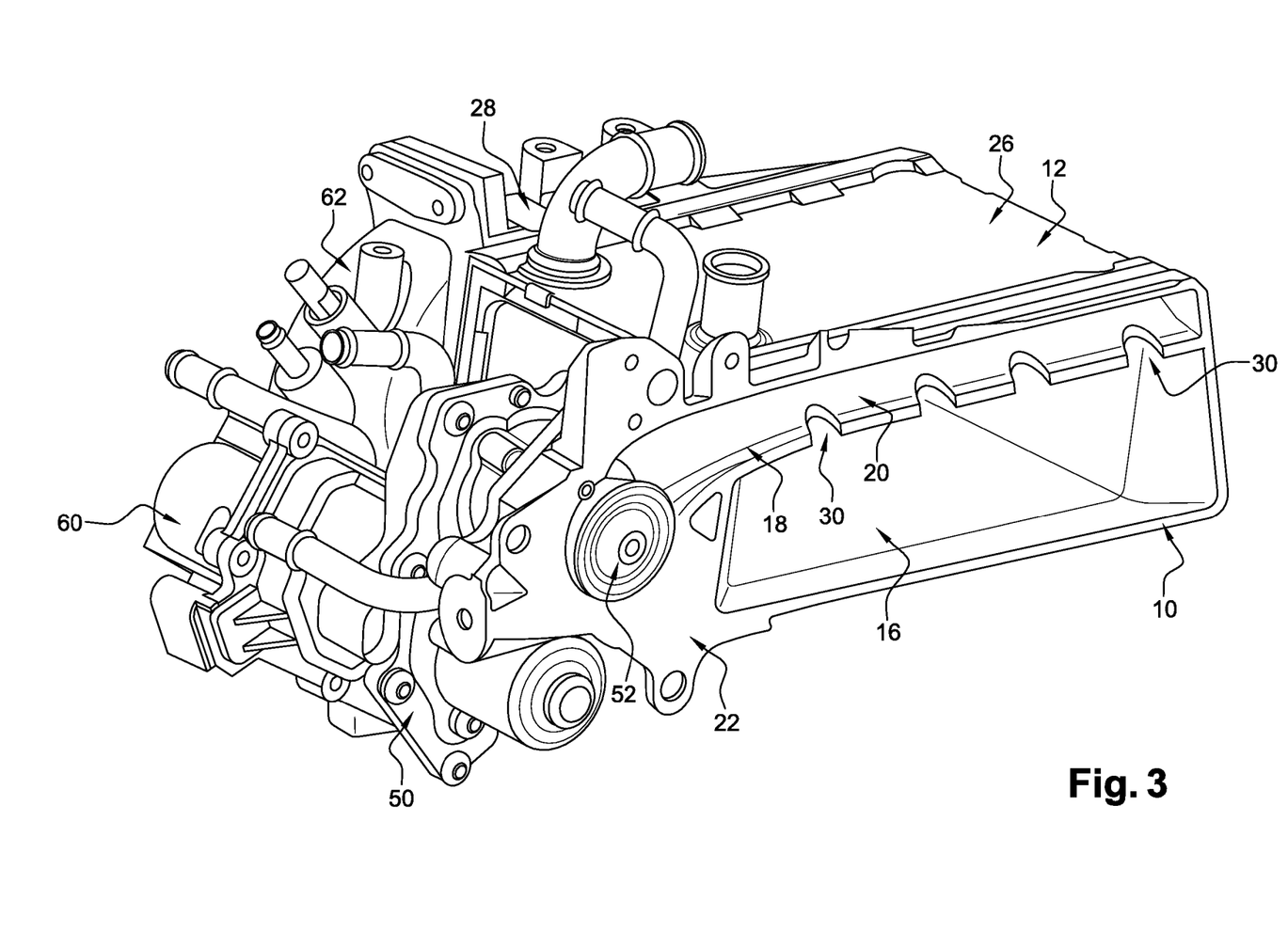
FIG. 3 is a partially cut away perspective view—on the side of the cylinder head of the engine—of the module of FIG. 2.

As is more particularly visible in FIG. 3, the connecting channel 18 has, in turn, a volume which decreases between the first opening 14 and the second opening 16, the volume located in the vicinity of the first opening 14, i.e. at the start of the connecting channel 18, being greater than that located in the vicinity of the second opening 16, i.e. at the end of the connecting channel 18.

In this example, the injection channel 20 comprises a plurality of orifices opening along the second opening 16 and in the volume defined by the second opening 16. The plurality of injection orifices 30 makes it possible to define an injection rail for the first gas (namely in this case the recirculated exhaust gases) in the second opening 16.

In this case, the injection of the recirculated exhaust gases is carried out perpendicular to the flow of the second gas (here the charge air) which passes through the heat exchanger bundle of the heat exchanger 12.

Moreover, the first opening 14 is bordered by a collar 22 capable of defining a fixing edge for a body 54 of the EGR valve 50.

The interface part 10 comprises a periphery having orifices 24 for the connection thereof to the cylinder head. In this case, the orifices 24 for the fixing of the interface part to the cylinder head are arranged in the region of protrusions arranged at least in the vicinity of the injection channel 20. The orifices 24 are capable of receiving fixing means, in this case screws, capable of fixing the interface element 10 to the cylinder head of the engine.

Figure 1A:
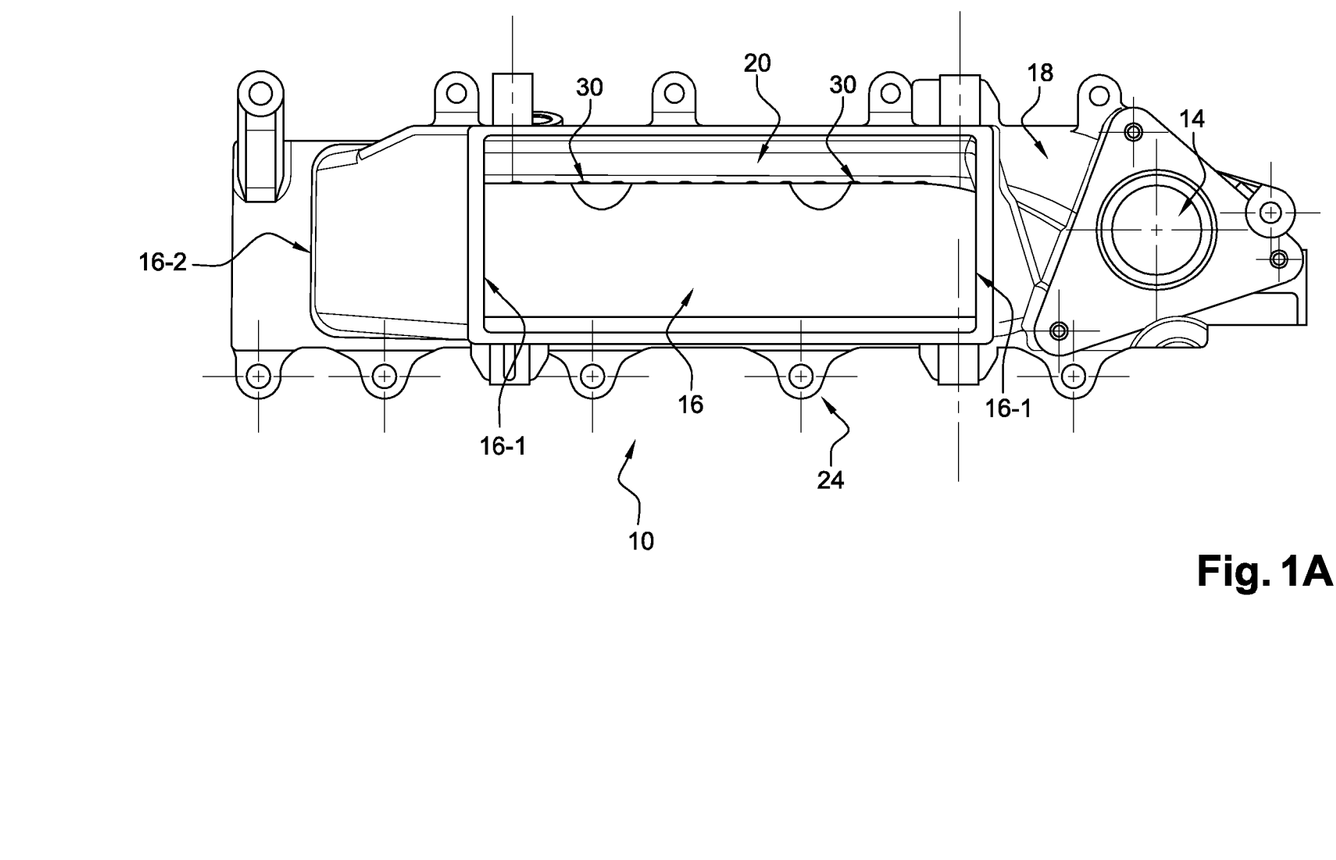
FIG. 1A is a front view—on the side of the heat exchanger bundle—of an interface part according to the invention
Figure 1B:
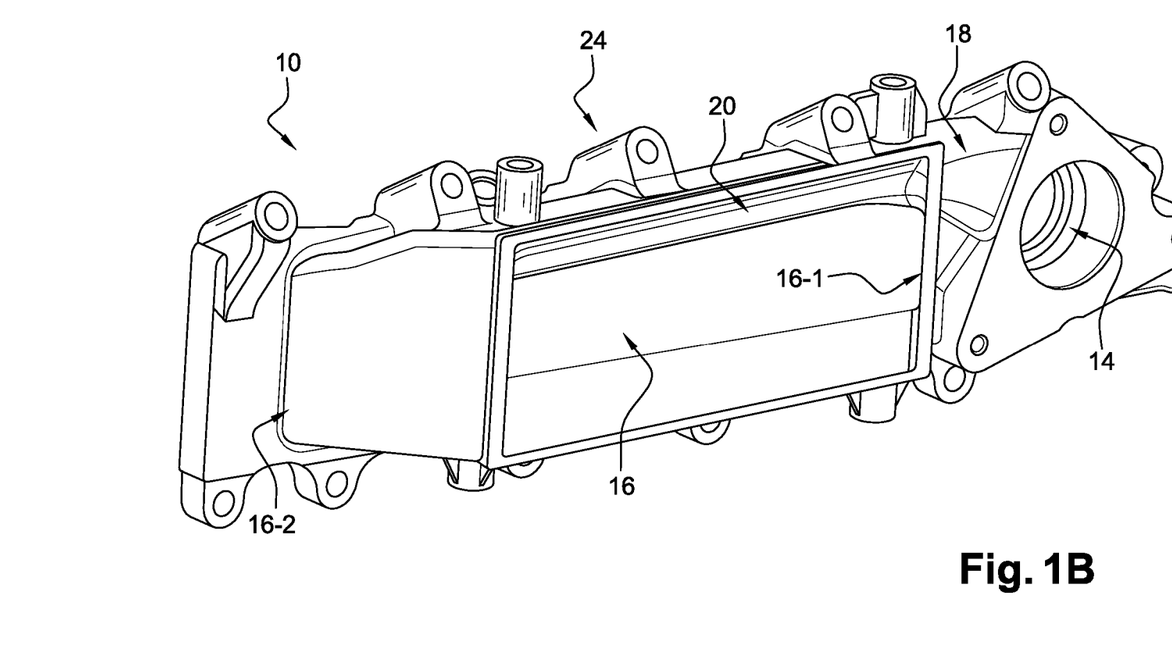
FIG. 1B is a perspective view of the interface part of FIG. 1A
Figure 1C:
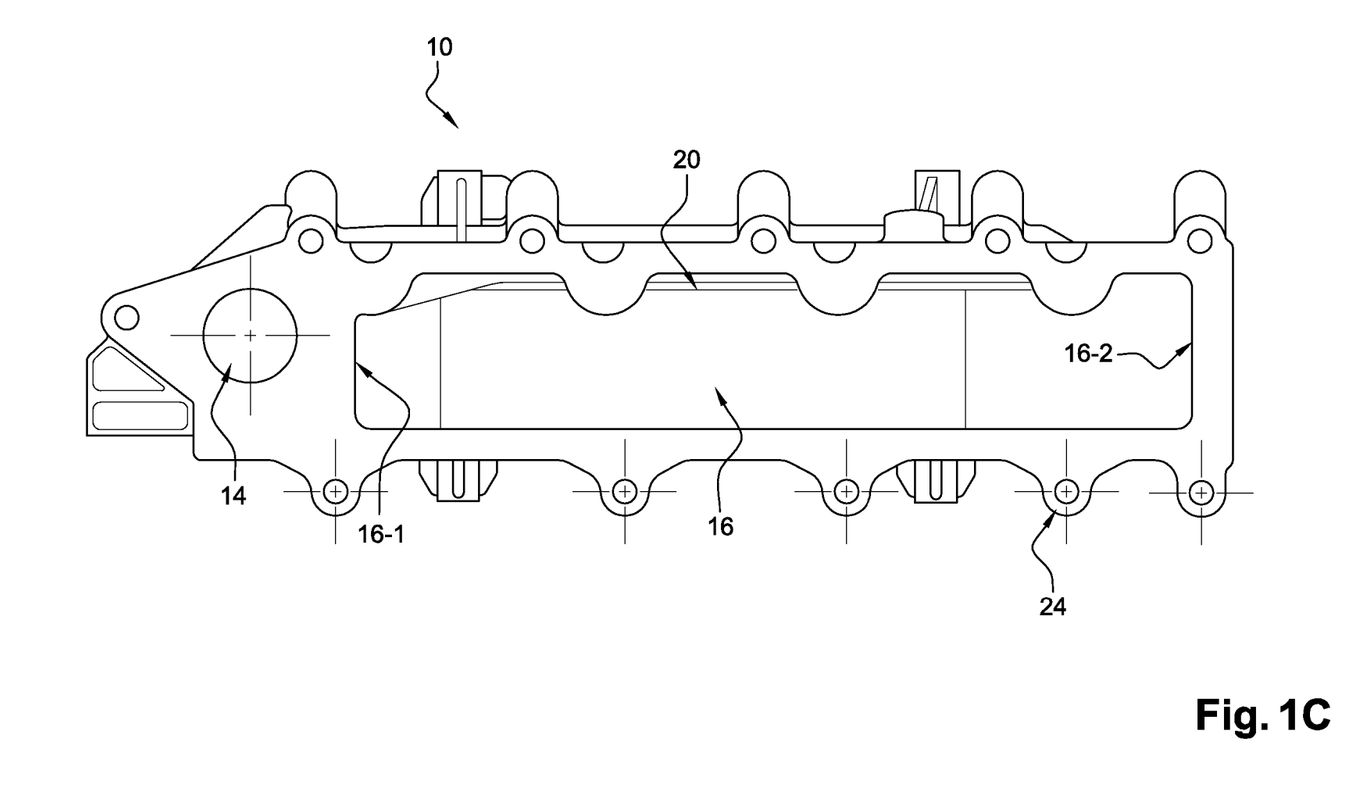
FIG. 1C is a front view—on the side of the cylinder head of the engine—of an interface part according to the invention
Figure 2:
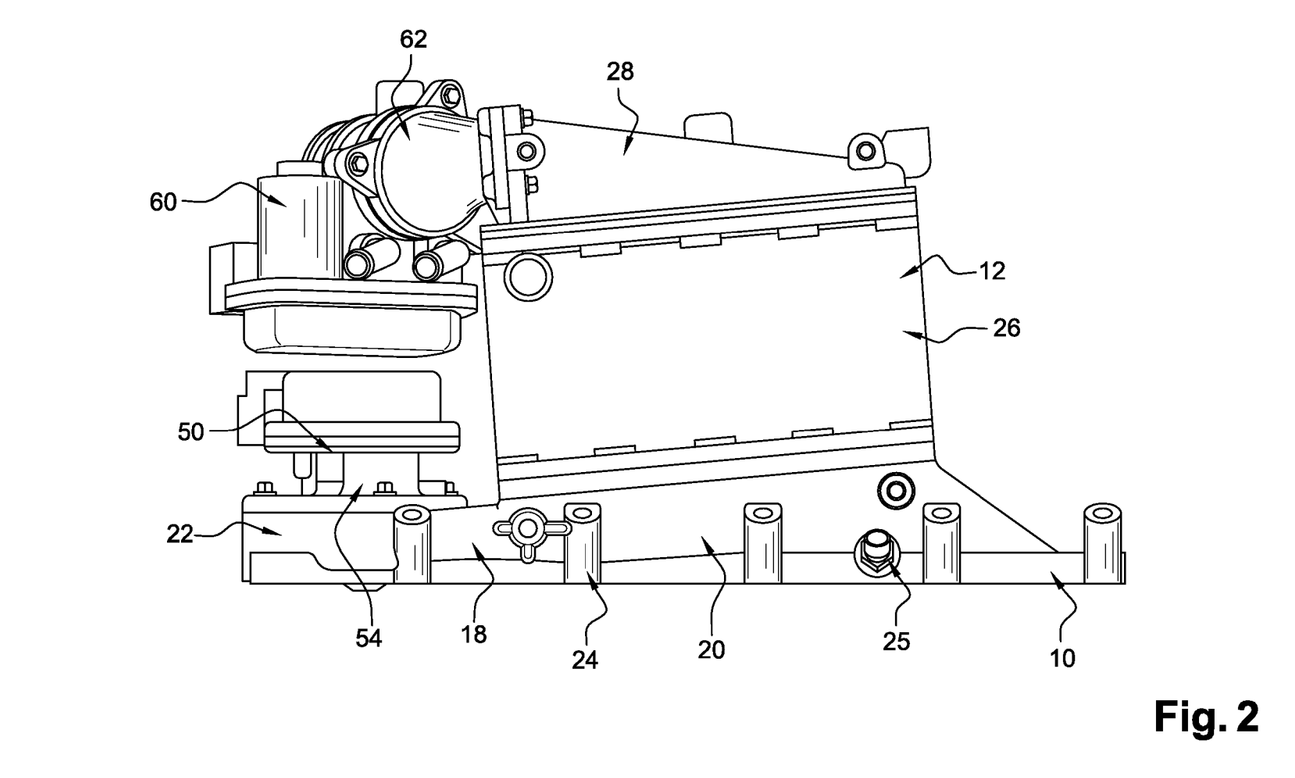
FIG. 2 is a view from above of a gas supply module for an engine according to the invention.

In the embodiment illustrated in FIGS. 1A to 1C, the orifices 24 are located over the entire periphery of the interface part 10.

A variant proposes that the interface part 10 further comprises a housing to receive a temperature and/or pressure sensor 25.

The invention also relates to an assembly of an interface part as disclosed above and an EGR valve 50.

The EGR valve 50 comprises at least one mobile part 52 and a body 54.

In this case, the mobile part 52 of the EGR valve 50 is inserted into an element of the slide valve produced in the form of a sleeve. In this embodiment, the body 54 of the slide valve receives the sleeve comprising the mobile part 52 of the EGR valve 50.

The sleeve comprising the mobile part 52 of the EGR valve 50 is capable of cooperating with the profile of the first opening 14 in order to seal at least partially the first opening 14 via the sleeve of the EGR valve 50.

In other words, in this case, the sleeve receiving the mobile part 52 is capable of closing at least partially the volume of the first opening 14 of the interface part 10.

In this embodiment, the mobile part 52 of the EGR valve 50 is a valve.

The body 54 of the EGR valve 50 is provided at the proximal end of the interface part 10 with a fixing flange capable of cooperating with the collar 22 of the interface part 10 for the EGR valve 50—interface 10 connection.

In the embodiment illustrated here, the EGR valve 50 and the interface part are each provided with through-orifices permitting the connection thereof via screws.

The invention also relates to a gas supply module for an engine comprising an assembly of an interface part and a slide valve.

The gas supply module further comprises the heat exchanger 12 provided with a bundle (not shown) positioned at least partially in front of the second opening 16 of the interface part 10. The heat exchanger bundle is traversed by charge air, said charge air being mixed in the region of the interface part 10 with the recirculated exhaust gases injected via the channels 18 and 20.

In other words, the gas supply module is configured to permit the passage of a first fluid (in this case charge air) passing through the heat exchanger 12 and the passage of a second fluid (in this case recirculated exhaust gases) passing through the EGR valve 50 and the two channels 18 and 20, the two fluids meeting and being mixed at the outlet of the heat exchanger bundle of the heat exchanger 12 (in this case in the region of the interface part 10 arranged at the outlet of the bundle).

In this embodiment, the heat exchanger 12 comprises a casing 26. The casing 26 is attached, for example by soldering or welding, to the interface element 10.

In the embodiment illustrated here, the casing 26 is formed by four metal plates, for example made of aluminum, and assembled together, for example by soldering. The plates of the casing 26 form an envelope comprising four so-called solid faces and two so-called free faces. The free faces of the casing 26 are located opposite one another.

The heat exchanger bundle (not shown) is inserted into the casing 26. Said bundle may, for example, be produced in the form of a stack of plates, not shown, creating a passage for the supply gases and a passage for a heat transfer fluid.

In this case, an intake manifold (also called the manifold box) 28 for the charge air is fixed to one of the free faces of the casing 26 whilst the interface part 10 is fixed to the other free face.

The gas supply module comprises in this case a gas supply valve 60 capable of directing said gases at least through the heat exchanger 12.

In this embodiment, the gas supply valve 60 capable of directing said gases at least through the heat exchanger 12 comprises a mobile part produced in the form of a butterfly valve (or flap). Said mobile part makes it possible to meter the quantity of charge air passing through the heat exchanger 12 and/or to throttle the engine.

The gas supply valve 60 of the heat exchanger 12 comprises, in this case, at least one valve body and an element 62 known as the outlet element 62. The valve body has an inlet for the gases in the gas supply valve 60 of the heat exchanger 12.

The outlet element 62 is attached to the valve body so as to form a first outlet of the supply valve 60 toward the heat exchanger 12. In other words, the outlet element 62 permits a communication between the gas supply valve 60 of the heat exchanger 12 and the heat exchanger 12 (and more particularly between the supply valve 60 and the intake manifold thereof).

The invention is not limited to the embodiments disclosed above which are given solely by way of example, but it encompasses all variants which the person skilled in the art might envisage within the scope of the following claims. The variants disclosed above may be used separately or in combination with one another.

The invention claimed is:

1. An interface part between a motor vehicle engine cylinder head and a heat exchanger, said interface part comprising:
    a first opening for the passage of a first gas, wherein said first opening has a profile capable of cooperating with an element of a slide valve comprising a mobile part of said slide valve in order to seal at least partially said first opening via said mobile part;
    a second opening capable of being aligned with at least one part of a bundle of the heat exchanger and a connecting channel,
        wherein said first opening and said second opening are connected by said connecting channel; and
    an injection channel extending between said connecting channel and a remote end of said connecting channel of said second opening,
    wherein said injection channel comprises a plurality of orifices opening along the second opening,
    wherein the second opening is common to each orifice of the plurality of orifices,
    wherein said connecting channel has a volume that decreases between the first opening and the second opening, the volume located in a vicinity of the first opening being greater than that located in a vicinity of the second opening, and
    wherein the heat exchanger is a charge air cooler.

2. The interface part as claimed in claim 1, in which said connecting channel and said injection channel are produced by casting with said interface part.

3. The interface part as claimed in claim 1, wherein said second opening has a proximal end of said connecting channel and a distal end of said connecting channel, said injection channel having a volume which decreases between an end of the injection channel adjacent to said connecting channel and an end of the injection channel adjacent to said distal end of said connecting channel.

4. The interface part as claimed in claim 1, wherein said first opening is bordered by a collar capable of defining a fixing edge for a body of said slide valve.

5. The interface part as claimed in claim 1, further comprising a periphery having orifices for the connection of said interface part to said cylinder head.

6. The interface part as claimed in claim 1, further comprising a housing for accommodating a temperature and/or pressure sensor.

7. An assembly of an interface part as claimed in claim 1 and a slide valve, said slide valve comprising an element having a mobile part being capable of cooperating with a profile of said first opening in order to seal at least partially said first opening via said element having said mobile part.

8. The assembly as claimed in claim 7, in which said mobile part is a valve and said profile of said first opening corresponds to the profile of said element comprising said valve.

9. A gas supply module for an engine comprising: an assembly of an interface part and a slide valve as claimed in claim 7, said module further comprising a heat exchanger provided with a bundle, said bundle being positioned at least partially in front of said second opening.

10. The module as claimed in claim 9, further comprising a gas supply valve capable of directing said gases at least through said heat exchanger.

11. An assembly of an interface part having a first opening, the interface part being between a motor vehicle engine cylinder head and a heat exchanger, the assembly comprising:

a slide valve,
wherein the slide valve comprises an element having a mobile part being capable of cooperating with a profile of said first opening in order to seal at least partially said first opening via said element having said mobile part, and
wherein said interface part comprises fixing means for fixing to the cylinder head,
wherein said first opening is a seat of the valve,
wherein said interface part further comprises:
   a second opening capable of being aligned with at least one part of a bundle of the heat exchanger and a connecting channel,
      wherein said first opening and said second opening are connected by said connecting channel; and
   an injection channel extending between said connecting channel and a remote end of said connecting channel of said second opening,
wherein said injection channel comprises a plurality of orifices opening along the second opening,
wherein the second opening is common to each orifice of the plurality of orifices, and
wherein said connecting channel has a volume that decreases between the first opening and the second opening, the volume located in a vicinity of the first opening being greater than that located in a vicinity of the second opening.

\* \* \* \* \*